(12) United States Patent
Vesper et al.

(10) Patent No.: US 7,166,147 B2
(45) Date of Patent: Jan. 23, 2007

(54) PROCESS AND DEVICE FOR SEPARATING AND EXHAUSTING GAS BUBBLES FROM LIQUIDS

(75) Inventors: Christian Vesper, Dortmund (DE); Ying Yu, Dortmund (DE); Ralf-Peter Peters, Bergisch-Gladbach (DE); Wolfgang Stoeters, Muelheim (DE)

(73) Assignee: Boehringer Ingelheim microParts GmbH, Dortmund (DE)

( * ) Notice: Subject to any disclaimer, the term of this patent is extended or adjusted under 35 U.S.C. 154(b) by 293 days.

(21) Appl. No.: 10/953,071

(22) Filed: Sep. 30, 2004

(65) Prior Publication Data
US 2005/0066812 A1 Mar. 31, 2005

(30) Foreign Application Priority Data
Sep. 30, 2003 (DE) ................. 103 45 818

(51) Int. Cl.
*B01D 19/00* (2006.01)
(52) U.S. Cl. ............................... 95/46; 96/6
(58) Field of Classification Search .............. 95/46; 96/6
See application file for complete search history.

(56) References Cited

U.S. PATENT DOCUMENTS

| 5,989,318 | A | 11/1999 | Schroll |
| 6,267,926 | B1 | 7/2001 | Reed et al. |
| 6,402,821 | B1 | 6/2002 | Matsuyama |
| 2002/0056675 | A1 | 5/2002 | Hegde |
| 2003/0194369 | A1 | 10/2003 | Prasad et al. |

FOREIGN PATENT DOCUMENTS

| DE | 1 959 679 | 2/1971 |
| DE | 42 19 966 | 1/1993 |
| EP | 1 355 372 | 10/2003 |

*Primary Examiner*—Duane Smith
*Assistant Examiner*—Douglas J. Theisen
(74) *Attorney, Agent, or Firm*—David S. Safran

(57) ABSTRACT

A process and a device for separating and exhausting gas bubbles from a flowing liquid, especially in a microfluidic system, are proposed. Radial deflection of the liquid, a preferably annular deaeration chamber from which gas can escape through gas separation material, and a following discharge filter are characteristic. The discharge filter is made of a hydrophilic material which forms pores or small channels. Optionally, there is an inlet filter of the corresponding material upstream of the deaeration chamber.

27 Claims, 5 Drawing Sheets

US 7,166,147 B2

PROCESS AND DEVICE FOR SEPARATING AND EXHAUSTING GAS BUBBLES FROM LIQUIDS

BACKGROUND OF THE INVENTION

1. Field of the Invention

The invention relates to a process for separating and exhausting gas bubbles from a flowing liquid, especially in a microfluidic system, in which the liquid which contains gas bubbles flows through a deaeration chamber on the way from an inlet point to a discharge point, and to a corresponding device with an inlet point for the entry of a liquid containing gas bubbles and a discharge point for the discharge of the liquid from the device, with a deaeration chamber downstream of the inlet point in the flow direction of the liquid.

2. Description of Related Art

In the process known from microfluidics, the separation of gas bubbles from liquids is achieved in that the water-based liquid which contains gas bubbles flows through a a deaeration chamber which has a wall section of a water-repellent gas separation material which is not permeable to the liquid, but which is permeable to the gas. With this known process, gas bubbles can be continuously (in this sense, therefore, without interruption) removed from a flowing liquid in a microfluidic system. The known process for separating and exhausting gas bubbles from a flowing liquid, therefore, the continuously operating process, requires routing of the liquid to a certain position and in terms of efficiency can still be improved.

Instead of water-based liquids, similar processes can also be carried out for oil-based liquids, possibly also for alcohols or resins. However, in fact, this process has special importance for water-based liquids.

German Patent DE 19 59 679, which forms the starting point of this invention, discloses a filter arrangement, especially for eliminating gas from a liquid flow. The arrangement has a housing with an inlet and an outlet for the liquid. In the housing, between the inlet and the outlet, there is a filter element which can be wetted by the liquid and which is permeable to the liquid, but not to the gas. Upstream of the filter element in the housing, there is a porous element which repels liquid and which is permeable to the gas, but not to the liquid, and which is made essentially flat. Using the porous element, the gas can be separated from the liquid upstream of the filter element and can be discharged through a separate gas outlet. The disadvantage is that the known filter arrangement does not work completely independently of position. Rather, it is necessary for the porous element to be located at least essentially above the liquid in order to be able to achieve gas separation as effective as possible.

European Patent Application EP 1 355 372 A2 and U.S. Patent Application 2003/194369 A1, which were filed before but published after the priority filing date of this application, disclose a chemical reactor which forms an integrated liquid-gas separator and which is surrounded by a water-repellent membrane which is permeable to hydrogen.

U.S. Pat. No. 6,402,821 discloses a position-dependent filter unit for removing impurities and bubbles from a development solution with a bubble filter only on the top.

Published German Patent Application DE 42 19 966 A1 discloses a filter for fluids with a rotationally symmetrical structure with a hydrophilic flat filter and an annular, water-repellent flat filter for self-deaeration, the two filters being located axially one behind the other and flow taking place through them in the same way.

Published U.S. Patent Application 2002/0056675 A1 discloses a position-dependent gas deaeration filter structure with a hollow fiber membrane which hangs loosely into the channel and which is connected to the water-repellent filter.

U.S. Pat. No. 5,989,318 relates to a water separator for separation of a two-phase flow into a liquid water component and a gas component. For purposes of separation, an inner water-repellent filter and an outer hydrophilic filter are used which are made as hollow cylinders and are arranged concentrically, and only gas can be separated radially to the inside by the water-repellent filter. It is not suited for gas separation independent of position.

U.S. Pat. No. 6,267,926 discloses a process and a device for separation of gases from a liquid which is first routed through a filter, and then, in parallel through a water-repellent, microporous membrane tube, gas bubbles being separated from the liquid through the membrane walls by means of negative pressure. This is complex.

SUMMARY OF THE INVENTION

A primary object of the present invention is to devise a process and a device for separating and exhausting gas bubbles from a flowing liquid so that separation of gas bubbles from the liquid can take place independently of position in a very effective and simple manner.

The aforementioned object is achieved by a process in accordance with the present invention by the flow path of the liquid being deflected between the inlet point and the deaeration chamber and between the deaeration chamber and the discharge point so that the liquid is first deflected radially outward from the axial direction into the deaeration chamber, and then, radially inward back into the axial direction. For the device of the invention, the aforementioned deflection can be accomplished very easily by the deaeration chamber being made at least essentially annular. Thus, the gas can be separated from the liquid through the gas separation material at least for the most part independently of the position.

The preferred process is based on a combination of materials which repel liquid, which absorb liquid, which are fluidically impermeable, which are arranged in a certain manner relative to one another, and which are touched in a certain manner by the flowing liquid which contains the gas bubbles. In particular, this applies to water-based liquids with water-repellent, hydrophilic and fluidically impermeable materials.

In the deaeration chamber, through which liquid flows in accordance with the invention, in a first version, there is a minor backpressure as a result of the discharge filter which adjoins the deaeration chamber; the filter being made of a material which absorbs the liquid and which forms pores or small channels. The gas bubbles can be exhausted from the liquid through the wall or the wall section of gas separation material from the deaeration chamber, this material even preventing passage of liquid. As a result of the pressure which prevails in the deaeration chamber and which is further increased by the discharge filter relative to ambient pressure, exhausting of the gas bubbles is comparatively effective. Moreover, in any case, the gas bubbles are also displaced from the discharge filter itself to the outside when there is a wall section of gas separation material on the discharge filter. The liquid which has been sucked into the discharge filter leads to displacement of the gas bubbles out if they had entered the discharge filter at all.

In another version, first a liquid flows through an inlet filter, likewise made of a material which absorbs the liquid and which forms pores or small channels. This inlet filter, as a result of its properties, also becomes completely soaked with liquid and increases the effectiveness of gas separation when it is bordered by at least one wall or a wall section of gas separation material. Gas bubbles can then be exhausted to the outside on a direct path from the inlet filter.

The preferably capillary-forming material of the inlet filter and of the discharge filter contribute to the positional insensitivity of the entire system which thus does not require a defined installation position and operating position. This applies especially when there is a deaeration chamber which is located radially outside and peripherally around the discharge filter and/or the inlet filter. This deaeration chamber can be made annular, especially circularly annular. However, also includes other shapes, such as square or polygonal ring shapes are contemplated for the deaeration chamber of the invention. Thus, this process is especially suited for microfluidic systems, for example, also in portable devices which are carried by users. The process of the invention is especially suited for insertion into an existing, especially microfluidic system.

The device in accordance with the invention makes it possible to separate and exhaust gas bubbles from a liquid independently of position. The device can be inserted into a line arrangement which carries the liquid and can operate without interruption. The device according to the invention operates passively; therefore, the device does not require an additional external energy source. Due to the skillful choice of operating elements, the pressure drop is comparatively small as the liquid flows through.

In principle, the process and device in accordance with the invention can be used for macrofluidic and microfluidic systems. However, the process and the device are especially important in microfluidic systems in dimensions between a few 10 microns and a few 100 microns.

Depending on the type of liquid, the composition of the liquid, the working temperature, etc., and the current dimensions in the system, especially in a microfluidic system, the viscosity of the particular liquid as well as the flow velocity in the system must likewise be defined. These parameters can lie within wide ranges depending on the material and conditions.

The filters used have not only the function of separation based on a material which absorbs the liquid, but also the function of particle filters.

The invention is explained in detail below with reference to the accompanying drawings which show several embodiments in accordance with the invention.

DETAILED DESCRIPTION OF THE INVENTION

In the figures, the same reference numbers are used for the same or similar components of the various embodiments that have the same or similar properties or advantages.

Figure 1:
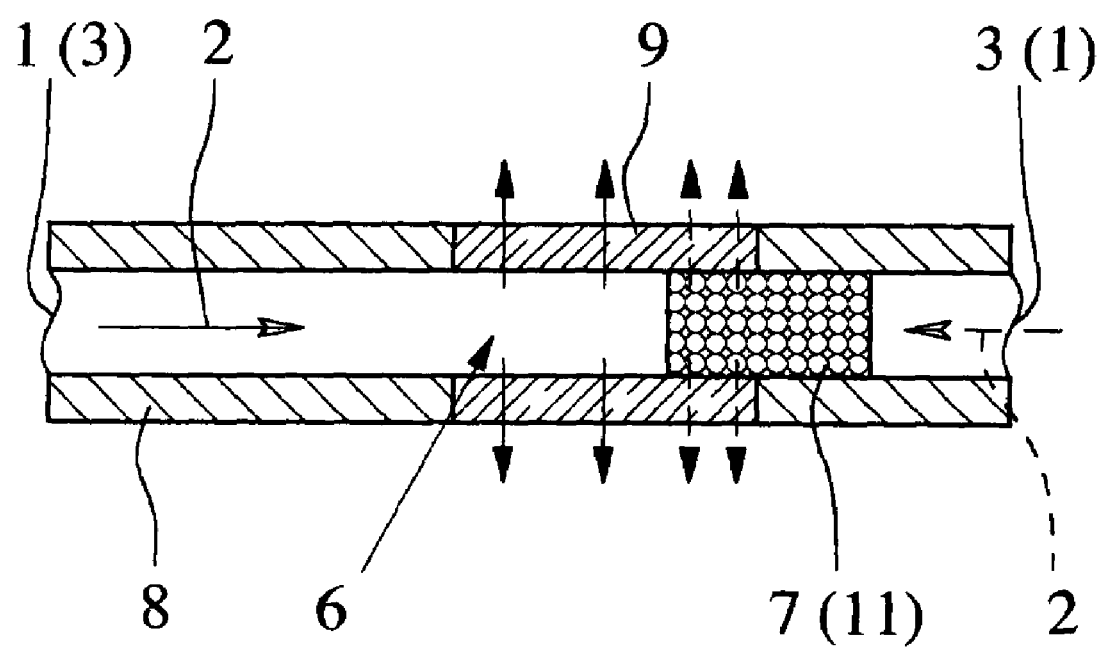
FIG. 1 is a schematic which explains the basic principle of gas bubble separation as such.

FIG. 1 shows the basic principle of gas separation. The device shown there will be explained first with reference to the flow direction of the liquid which is indicated by the solid line arrow on the left.

The device is used for separating and exhausting gas bubbles from a flowing liquid, especially in a microfluidic system. There are an inlet point 1 for the entry of a liquid 2 which contains gas bubbles and a discharge point 3 for discharge of this liquid 2 from the device.

Figure 2:
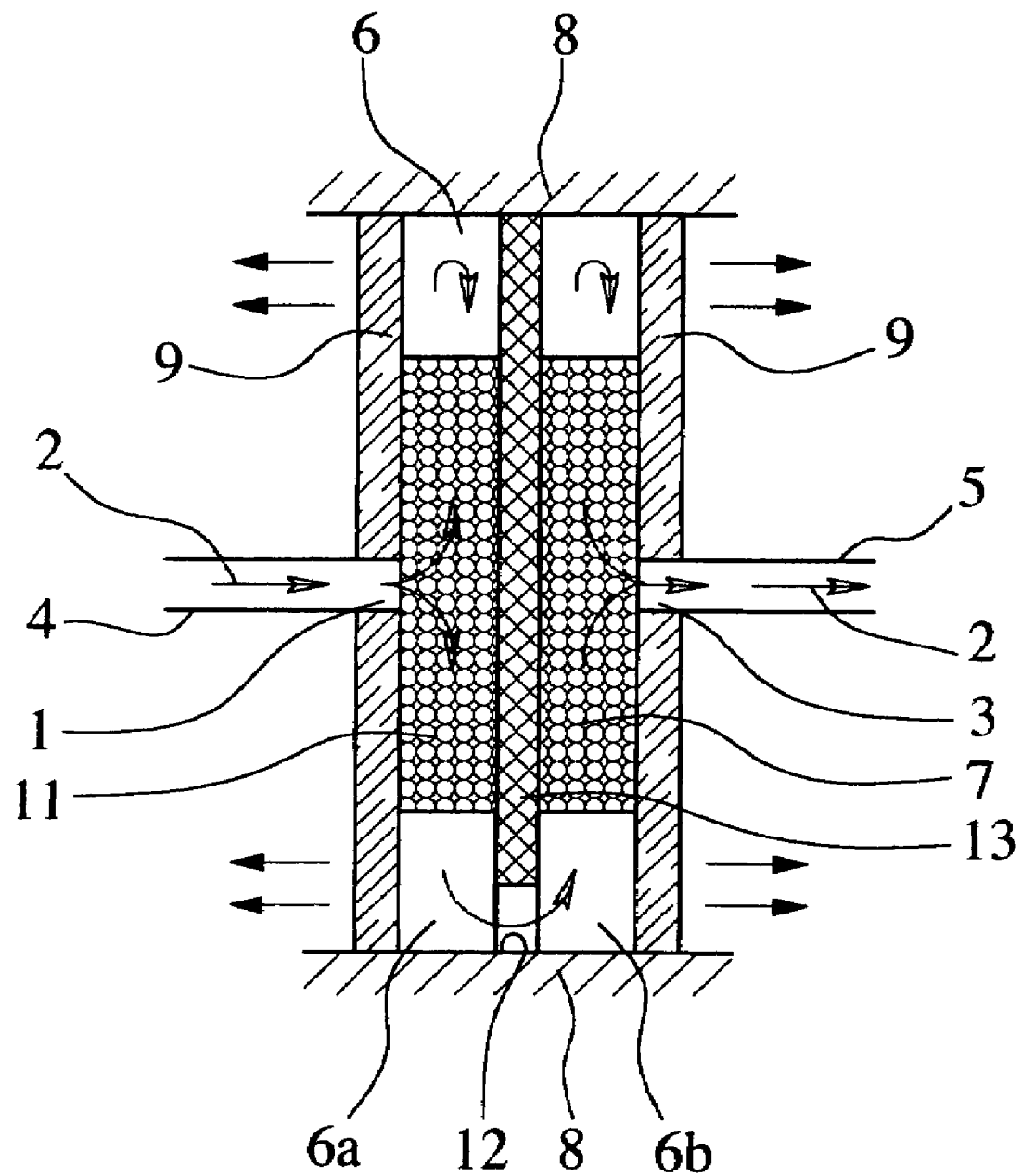
FIG. 2 is a sectional view of a first embodiment of a device in accordance with the invention.

FIG. 2 indicates a connecting line 4 which leads to the inlet point 1, and a connecting line 5 which leads away from the discharge point 3. The connecting lines 4, 5 can be hoses, rigid lines, flow channels in a chip, etc. It is important that the liquid 2 which contains the gas bubbles on the route from the inlet point 1 to the discharge point 3 first flows through a deaeration chamber 6 which is located in the flow direction of the liquid 2 downstream of the inlet point 1. The deaeration chamber 6 is connected to a discharge filter 7 through which then the liquid 2 flows. The flow of liquid 2 at the inlet point 1 and at the discharge point 3 proceeds at least essentially in the same axial direction even if the inlet point 1 and the discharge point 3 can be offset against one another, especially therefore optionally transversely to the axial direction.

FIG. 1 shows for the explained basic principle, that the deaeration chamber 6 is bordered, first of all, by axially running outer walls 8 which consist of a material which is permeable neither to the liquid 2 nor to gas. Furthermore, it is provided that the deaeration chamber 6 is bordered by at least one wall 9 (FIGS. 1, 2) or one wall section 10 (FIG. 3) which is made of a gas separation material which repels the liquid and which is not permeable to the liquid 2, but which is permeable to the gas which is carried by the liquid 2.

Conversely, the discharge filter 7 is made of a material which absorbs the liquid 2 and which forms pores or small chambers such that the liquid 2 which is flowing through there experiences only a minor pressure drop.

It is important that the delivery pressure of the liquid 2, the flow resistance of the wall 9 of the deaeration chamber 6 of gas separation material for the gas and the storage action of the discharge filter 7 of a material which absorbs the liquid for the liquid 2 are matched to one another such that the gas bubbles which are contained in the liquid 2 to a large extent escape to the outside through the wall 9.

In FIG. 1, the arrows with solid arrowheads represent the flow of gas being discharged via the walls 9 which border the deaeration chamber 6, here, over the entire area in the axial direction. The arrows which have hollow arrowheads represent the flow of the liquid 2.

In the first version which is shown in FIG. 1 in solid lines, the discharge filter 7 acts to slightly increase the pressure for the interior of the deaeration chamber 6 so that separation of gas bubbles becomes more effective. Likewise, the gas bubbles 9 which should have been entrained with the liquid 2 into the discharge filter 7 are displaced radially out of the filter by the section of the wall 9 there, because the discharge filter 7 also is made of a material which absorbs the liquid.

FIG. 1 shows a second version in which the inlet point 1 and the discharge point 3 are interchanged, which is indicated by parentheses on the reference numbers. Here, the flow of the liquid 2 is represented by broken-line arrows. In this case, the filter acts as an inlet filter 11 and increases the separation rate for gas bubbles in that, here, in the inlet filter 11, separation takes place radially to the outside via the wall 9 as a result of the water-absorbing properties of the material of the inlet filter 11.

Following the basic principle which was explained with reference to FIG. 1, FIG. 2 now shows a first embodiment in accordance with the invention. The same reference numbers as before are used.

The system illustrated in FIG. 2 shows that between the inlet point 1 and the deaeration chamber 6 there is an inlet filter 11 through which the flow path of the liquid 2 leads. The inlet filter 11 consists of a material which absorbs the liquid and which forms pores or small channels such that the liquid 2 as it flows through the inlet filter 11 experiences only a minor pressure drop. The combination of the inlet filter 11 and the discharge filter 7 leads to the best mode of operation of the preferably annular deaeration chamber 6 which is implemented between them. Preferably the axial direction runs transversely, especially perpendicularly, to the radial plane of the deaeration chamber 6.

Figure 3:
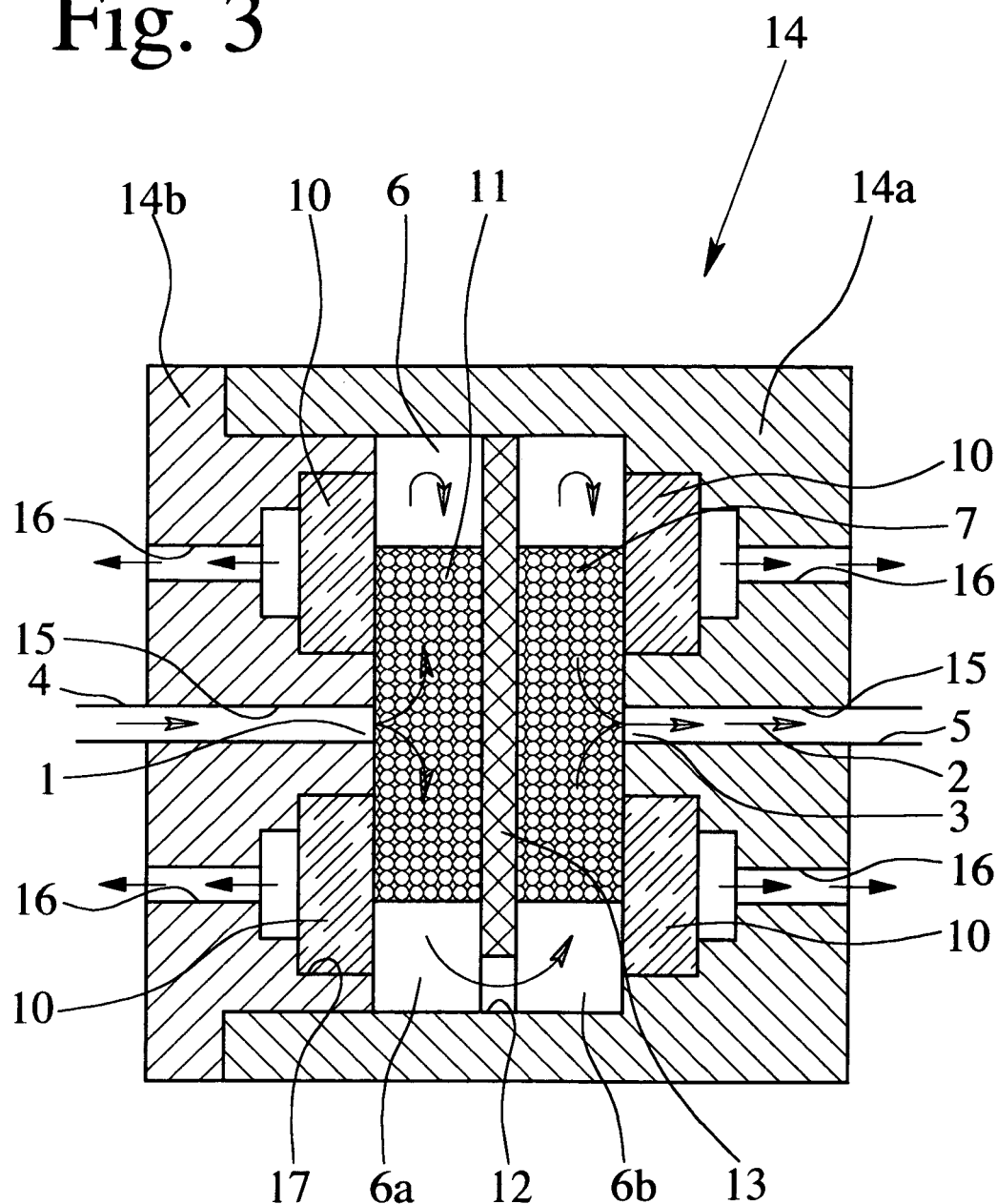
FIG. 3 is a sectional view of second embodiment of a device of the invention.

The embodiment shown in FIG. 2, moreover, likewise makes it clear that the wall 9 of the deaeration chamber 6 of gas separation material extends into the area of the discharge filter 7 and/or into the area of the inlet filter 11 and/or preferably into the radially outer areas of the deaeration chamber 6. The illustrated embodiment shows the walls 9, enclosing the inlet point 1 over their entire area, on the one hand, and the discharge point 3 on the other. In this way, as flow proceeds through the discharge filter 7 and the inlet filter 11, gas can escape from the liquid through the corresponding wall 9. FIG. 3 shows something similar for the wall sections 10 which are implemented there.

FIG. 2 shows that, with the process of the invention and the illustrated device, it is possible to maintain the existing line routing for the liquid 2, indicated by the lines 4, 5, and to arrange the device easily "in-line".

The preferred embodiment, which is shown in FIG. 2, is furthermore especially characterized in that the flow path of the liquid 2 is deflected between the inlet point 1 and the deaeration chamber 6, specifically here in the inlet filter 1, and between the deaeration chamber 6 and the discharge point 3, in this embodiment, in the discharge filter 7. To do this, it is provided in particular that the deaeration chamber 6 is located radially outward to the inlet point 1, in the illustrated embodiment, specifically that the deaeration chamber 6 annularly, especially circularly, surrounds both the discharge filter 7 and the inlet filter 11.

FIG. 2 shows a deflection by roughly 90° such that the deflection from the axial direction takes place radially outward in numerous directions, especially in a radiating manner or vice versa radiating radially into the axial direction. The flow of liquid 2 into the material of the discharge filter 7 and inlet filter 11, which material absorbs the liquid 2, is delayed and a collecting action for gas bubbles in the deaeration chamber 6 occurs.

The illustrated construction makes the execution of the invention completely independent of position. The capillary forces which occur in the discharge filter 7 and, as present and preferred, in the inlet filter 11, make superfluous the use of the gravity principle which is otherwise necessary in devices of the type under consideration.

Furthermore, the preferred embodiment which is illustrated in FIG. 2 shows that, between the inlet point 1 and the discharge point 3, there are two deaeration chambers 6a, 6b which are located in succession in the flow direction of the liquid 2 and which are separated from one another via a separating layer 13 which can simply have one through opening 12 or can have several through openings. FIG. 2, in the illustration of this basic principle, shows how the single through opening 12 (which is recognizable at the bottom) necessarily guides the liquid flow in the annulus of the deaeration chamber 6 so that optimum deflection of the liquid 2 and correspondingly optimum gas separation take place. In any case, it can be stated that deflection of the liquid 2 in the deaeration chamber 6 is not absolutely necessary to implement the system of the invention. However, it does support the effectiveness of gas separation.

In the specific embodiment of the device of the invention which is shown in FIG. 3, a construction is implemented which is somewhat different than that of the basic principle shown in FIG. 2. Here, the device has a housing 14, preferably composed of a housing body 14a and housing cover 14b, of a material which is impermeable to the liquid and gas, that in the housing 14 liquid flow channels 15 and gas flow channels 16 are formed and that wall sections 10 of gas separation material are made as inserts at the corresponding points of the housing 14. The fundamental arrangement which is shown in FIGS. 1 and 2 has outside walls 8 which can be channel walls of a recessed channel, for example, in a microfluidic system. Conversely, in the embodiment in FIG. 3, there is a separate housing 14. Furthermore, the wall sections 10 for forming the gas separation areas are arranged flush in the recesses 17 in the housing body 14a and the housing cover 14b. The "sandwich arrangement" of the basic principle from FIG. 2 can therefore be repeated in the embodiment shown in FIG. 3. If there is a microfluidic arrangement with very small dimensions, it is recommended that the parts be made from a material which repels liquid and/or the parts be made from a material which absorbs liquid as a membrane.

For water-repellent membranes in a microfluidic system, for example, an acrylic copolymer is possible which has acquired the required water-repellent properties by special treatment. Typical thicknesses are between roughly 100 microns and roughly 300 microns, especially between roughly 200 microns and roughly 250 microns. The pore sizes vary preferably in the range from 0.1 micron to 10.0 microns.

Hydrophilic membranes can be produced, for example, from hydrophilic polyether-sulfone material. The dimensions both for thickness and also pore size are comparable to that which was specified above for the water-repellent material. An acrylic-polymer material can also be used as the hydrophilic membrane. The desired properties for water-based liquids are achieved by making the material hydrophilic. The thickness for a hydrophilic membrane of polyether-sulfone material is roughly 100 microns to roughly 160 microns, The thickness for a membrane of acrylic-polymer material is 100 microns to roughly 270 microns. For the specific execution of the device, for example, two hydrophilic membranes lying on top of one another can each form the inlet filter and the discharge filter.

To have an idea of the preferred embodiment in terms of dimensions, it can be assumed for FIG. 2, for example, that the diameter of the overall arrangement in the radial direction is between roughly 3 mm and roughly 8 mm, preferably roughly 5 mm, while the thickness in the "sandwich arrangement" in the axial direction is between roughly 2 mm and roughly 8 mm, preferably roughly 3 mm. The cross section of the inlet point and the discharge point in a microfluidic system is generally much less than 0.5 mm.

As has already been pointed out above, the parameters of operation of a device of the type under consideration, especially the viscosity and flow velocity of the liquid, can be set within wide ranges depending on other parameters; this can be found by the corresponding tests.

With respect to the construction of the device, conventional production and joining techniques especially of microstructure engineering can be used. For a connection, in addition to precision cementing, ultrasonic welding of the individual components, especially in a system with a sandwich structure as explained above, is especially of interest.

Regardless of the aforementioned specifications, for a special microfluidic system, the basic principle of the invention can also be used in the macrofluidic area, and therefore for much larger dimensions.

For the filters 7, 11, one interesting material can also be a sintered material of ceramic, glass frit, or other microstructure materials, as well as plastic-sintered material.

Figure 4:
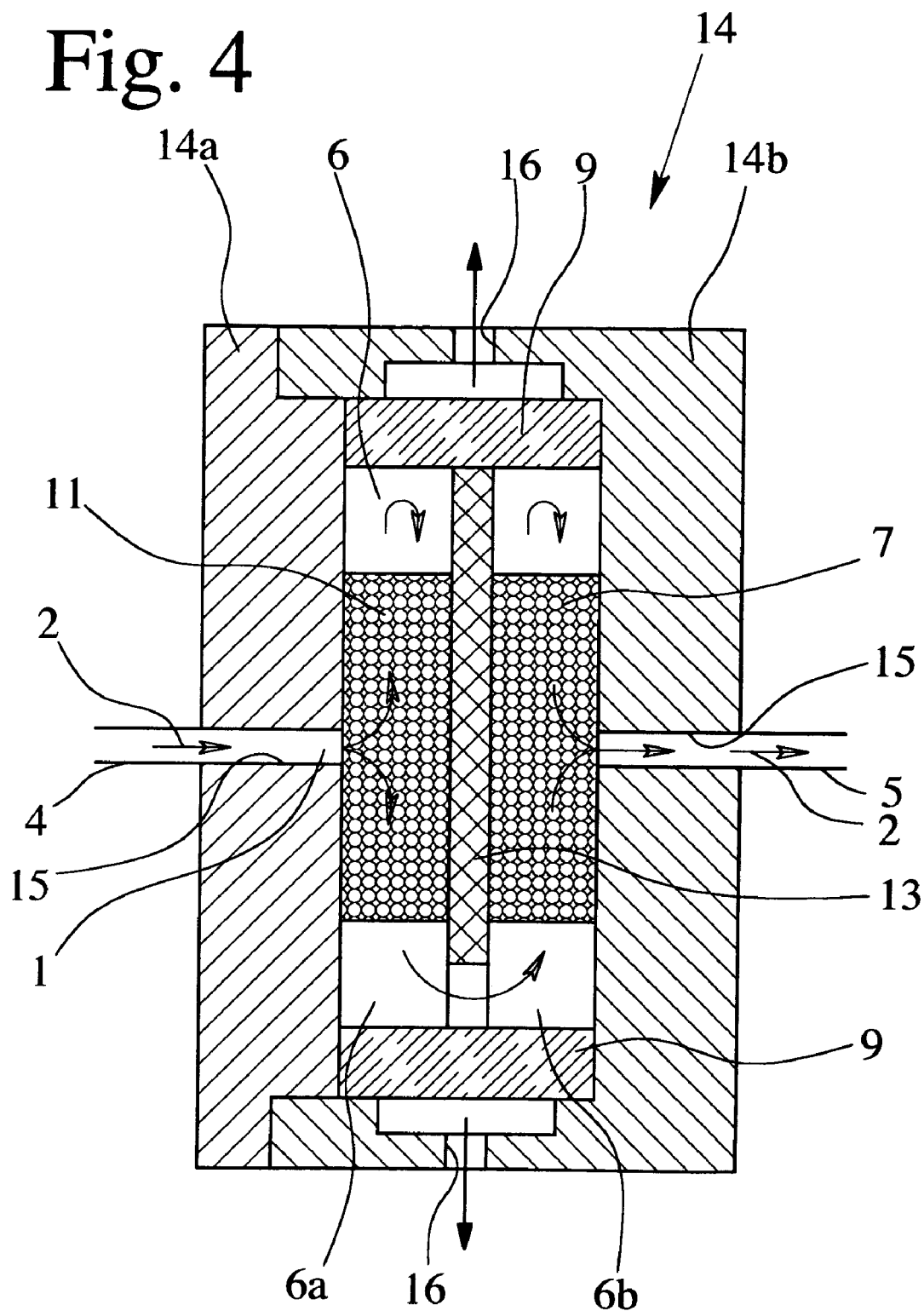
FIG. 4 is a sectional view of a third embodiment of a device according to the invention.

A further embodiment which is shown in FIG. 4 largely agrees in principle with the embodiment from FIG. 3. Here, the gas is exhausted radially from the liquid 2, not axially, via a gas-permeable wall 9 made as an annular collar and which is inserted between the housing body 14a and the housing cover 14b.

Figure 5:
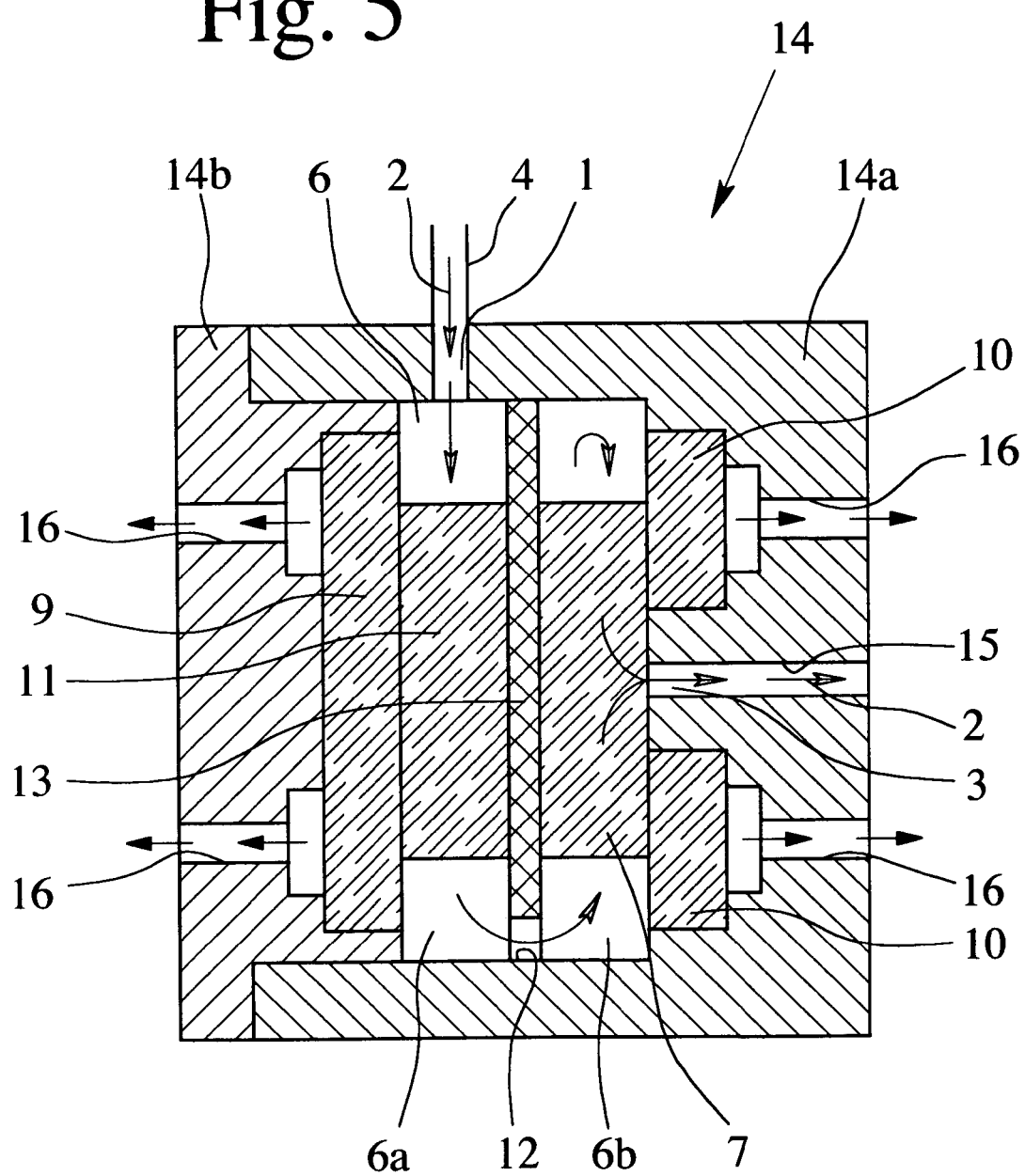
FIG. 5 is a sectional view of a fourth embodiment of a device in accordance with the invention.

Finally, the embodiment shown in FIG. 5 shows radial feed of the liquid 2 at the inlet point 1, conversely axial removal of the liquid 2 at the discharge point 3. Here, the inlet filter 11 is a spacer for definition of the deaeration chamber 6. It could even be completely eliminated in an especially compact execution. The wall 9 of a liquid-repelling material extends parallel to the inlet filter 11 and leads to exhausting of the gas through the corresponding flow channels 16.

If we examine the embodiment from FIG. 3 by way of example, the following modes of operation can be explained in summary:

The liquid 2 which is water-based here and which is to be deaerated is supplied to the inlet point 1 by the connecting line 4 and first flows through the hydrophilic membrane which forms the inlet filter 11, with a defined pore size. Afterwards, a membrane which forms the separating layer 13 and which is impermeable to the liquid 2 causes a reversal of the direction of liquid flow roughly perpendicularly to the original flow direction. The liquid 2 then laterally enters the deaeration chamber 6 which is arranged annularly around the hydrophilic membrane which forms the inlet filter 11. Through a small through opening 12 in the membrane which forms the separating layer 13, the liquid 2 flows out of the deaeration chamber 6a into the following deaeration chamber 6b. From there, the liquid 2 flows radially through the hydrophilic membrane which forms the discharge filter 7, is deflected in turn roughly at a right angle within this membrane, and leaves the device at the discharge point 3. In the area of the deaeration chamber 6, the gas from the liquid 2 passes through the wall sections 10 of water-repellent material, the corresponding water-repellent membranes, following an existing pressure difference, and leaves the device via the indicated gas flow channels 16. This separation of gas bubbles takes place continuously from the liquid 2 which is flowing through the deaeration chambers 6a, 6b.

Particle filtration can also take place by the membranes which form the filters 7, 11. Depending on the pore size or channel cross section in the filters 7, 11 different particle sizes are separated.

The process and device in accordance with the invention can also be implemented in the same way for oil-based liquids if, instead of the water-repellant and hydrophilic materials, the corresponding oleophobic and oleophilic materials are used. The corresponding liquids would also be, for example, alcohols or resins for which the correspondingly matching materials could be chosen.

What is claimed is:

1. Process for separating and exhausting gas bubbles from a continuously flowing liquid which contains gas bubbles during passage thereof through a deaeration chamber between an inlet point and a discharge point, comprising the steps of:
    locating the deaeration chamber between a flow of liquid at the inlet point and a flow of liquid at the discharge point which run at least essentially in the same axial direction,
    providing a lower pressure on the outside of the deaeration chamber than in the deaeration chamber,
    providing the deaeration chamber with at least a section of at least one wall made of a gas separation material which repels liquid, but which is permeable to gas,
    causing the liquid to flow from at least one of the inlet to deaeration chamber via an inlet filter and from the deaeration chamber to the outlet to pass through a discharge filter, the at least one filter being made of a material which absorbs the liquid and which forms pores or small channels,
    matching the delivery pressure of the liquid, the flow resistance of the gas separation material of the deaeration chamber and the liquid absorbency of the at least one discharge filter to one another such that the gas bubbles which are contained in the liquid, to a large extent, escape to the outside through the wall,
    causing the flow path of the liquid to be deflected between the inlet point and the deaeration chamber and between the deaeration chamber and the discharge point so that the liquid is deflected from the axial direction, first radially outward into the deaeration chamber and then radially inward back into the axial direction for separating the gas from the liquid by the gas separation material independently of the position of the deaeration chamber.

2. Process as claimed in claim 1, wherein at least the liquid flows, at least in sections, annularly in the deaeration chamber.

3. Process as claimed in claim 1, wherein the flow path of the liquid in at least one of the discharge filter and the inlet filter is caused to border the at least one section of the at least one wall section of the deaeration chamber made of said gas separation material.

4. Process as claimed in claim 1, wherein the liquid is deflected between at least one of the inlet point and the deaeration chamber in the inlet filter and between the deaeration chamber and the discharge point in the discharge filter.

5. Process as claimed in claim 1, wherein deflection of the flow path is at an angle of roughly 90°.

6. Process as claimed in claim 1, wherein the liquid is deflected at least one of radially out of the axial direction in a number of directions, and radially inward and into the axial direction.

7. Process as claimed in claim 1, wherein the deaeration chamber is located radially outward of and peripherally around at least one of the discharge filter and the inlet filter.

8. Process as claimed in claim 1, wherein the liquid is caused to flow at least essentially radially through at least one of the discharge filter and the inlet filter.

9. Process as claimed in claim 1, wherein the inlet point and the discharge point are axially aligned with one another.

10. Process as claimed in claim 1, wherein the liquid flows through two deaeration chambers which are located in succession in the flow direction and which are separated from one another via a separating layer with at least one through opening.

11. Process as claimed in claim 1, wherein the liquid enters the inlet filter in the axial direction at an inlet point of the inlet filter, is deflected radially outward in the inlet filter, radially enters a deaeration chamber which annularly surrounds the inlet filter and flows through it, axially enters at at least one point the second deaeration chamber which annularly surrounds the discharge filter and flows through it, radially enters the discharge filter, is deflected in the discharge filter into the axial direction and emerges from the discharge filter at the discharge point in the axial direction.

12. Device for separating and exhausting gas bubbles from a continuously flowing liquid, comprising:
- an inlet point for the entry of a liquid containing gas bubbles and a discharge point for the discharge of the liquid from the device,
- a deaeration chamber located downstream of the inlet point in a flow direction of the liquid,
- means for producing a higher pressure in the deaeration chamber than on the outside of the deaeration chamber,
- wherein the deaeration chamber is bordered by walls, at least a wall section of which is formed of a gas separation material which repels liquid, but which is permeable to gas,
- wherein at least one of an inlet filter and a discharge filter is provided, respectively, in an inlet flow from the inlet to deaeration chamber or in a discharge flow from the deaeration chamber to the outlet, the at least one filter being made of a material which absorbs the liquid and which forms pores or small channels,
- wherein the delivery pressure of the liquid, the flow resistance of the gas separation material of the deaeration chamber and the liquid absorbency of the at least one filter being matched to one another such that the gas bubbles which are contained in the liquid are caused to escape to a large extent outward through the gas separation material of the deaeration chamber, and
- wherein the deaeration chamber is annular for enabling gas to be separated from the liquid by the gas separation material independently of the position of the deaeration chamber.

13. Device as claimed in claim 12, wherein a flow path for the flow of liquid at the inlet point and at the discharge point runs at least essentially in the same axial direction and wherein the flow path of the liquid is deflected between the inlet point and the deaeration chamber and between the deaeration chamber and the discharge point so that the liquid is deflected from the axial direction first radially outward into the deaeration chamber and then radially inward to and back into the axial direction.

14. Device as claimed in claim 12, wherein the gas separation material extends into an area of at least one of the discharge filter and the inlet filter.

15. Device as claimed in claim 12, wherein the inlet point and the discharge point are arranged in axial alignment.

16. Device as claimed in claim 12, wherein the deaeration chamber is located radially outward and peripherally with respect to the inlet point.

17. Device as claimed in claim 12, wherein the deaeration chamber annularly surrounds at least one of the discharge filter and the inlet filter.

18. Device as claimed in claim 12, wherein two deaeration chambers are provided in succession between the inlet point and the discharge point in the flow direction of the liquid, the deaeration chambers being separated from each another by a separating layer which has at least one through opening.

19. Device as claimed in claim 12, wherein the gas separation material is a disk which is located at at least one of the inlet point and the discharge point.

20. Device as claimed in claim 12, wherein the device has a housing that is formed of a material which is impermeable to the liquid and gas, wherein liquid flow channels and gas flow channels are formed in the housing and wherein wall sections of the gas separation material are made as inserts at the corresponding points of the housing.

21. Device as claimed in claim 20, wherein the housing comprises a housing body and a housing cover.

22. Device as claimed in claim 20, wherein the corresponding points on the housing are made as recesses.

23. Device as claimed in claim 12, wherein at least one of the material which repels liquid and the material which absorbs liquid are membranes.

24. Device as claimed in claim 12, wherein the thickness of the parts of a liquid-repelling material is between 100 microns and 300 microns, preferably between 200 microns and 250 microns.

25. Device as claimed in claim 12, wherein the liquid-absorbing material has a thickness between 200 microns and 500 microns.

26. Device as claimed in claim 12, wherein the liquid-absorbing material has a thickness between 300 microns and 400 microns.

27. Device as claimed in claim 12, wherein at least one of the discharge filter and the inlet filter are made of a sintered material.

* * * * *